Patented June 30, 1936

2,045,836

UNITED STATES PATENT OFFICE 2,045,836

TITANIUM PRODUCT AND METHOD OF MAKING SAME

Oscar T. Coffelt, Jackson, Mich., assignor, by mesne assignments, to E. I. du Pont de Nemours and Company, a corporation of Delaware No Drawing. Application January 2, 1935, Serial No. 101

1 Claim. (Cl. 23—56)

This invention relates to chemical compounds of the element titanium. New and useful products are herein disclosed along with procedures to obtain these new compositions of matter.

It has long been known that if a dilute solution of titanium sulfate is heated for a period of time, an insoluble titanium product is thrown out of solution that contains varying amounts of the sulfate ion. No definite law has been shown whereby one might predetermine the sulfate content of such a product. Experience has shown that under set conditions a product can be consistently formed with approximate equal sulfate content, and that by varying such conditions as dilution, acidity, temperature etc., the sulfate content can likewise be varied. Similarly in treating a chloride or phosphate solution the chloride or phosphate of the respective solution is found in varying amounts in the resulting insoluble product.

Very little literature exists on the comprehensive explanation of the chemical composition of hydrolized titanium products. This is accounted for in part by the difficulties encountered in their analysis. A physical difference is obvious as some products are gelatinous, some colloids, and some having definite crystalline structure. The former gelatinous products are in general called titanic acids, the colloidal and more crystalline are termed titanium basic hydrates or basic titanium sulfates. In most cases of reference, complete supporting analysis is absent. There is also the unanswered question as to whether the presence of the acid radical in the solid is due to incomplete disassociation, whether it is due to absorption or chemical formation. It is not my intent to confirm or deny these theories, but owing to similarities of these materials and my new compositions a distinction is herein shown.

I have discovered that if a solution of titanium in the proper condition of dilution, acidity etc., be in the presence of chromic acid, and contained in the same solvent, conditions are possible for the formation of an insoluble product of titanium that contains amounts of the chromate ion. And that the amount of the chromate in the formed solid appears to vary with the conditions and mode of formation, as dilution, acidity, temperature etc. I have found that the new material can be made by various manners and at the same time have products of close physical resemblance and chemical composition.

In general my new products can be prepared by similar methods as the above materials, there being the difference in the choice of materials to use. I have made my new products by several different methods, and have found variations in the amount of chromates in the final products, and variations in the amount of impurities present such as iron, sulfate etc., from none up to the amounts found in the similar sulfate compounds.

My products are distinguished from other products as being a titanium compound containing in composition chromium in the form of a chromate. This is distinguished first by colors that are characteristic of chromate compounds. Second by treating the solids with a sodium hydroxide solution and heating, the chromates are taken into solution as sodium chromate, a titanium compound remaining as a solid. The chromates in this solution can be recognized and determined by well known tests and procedures. The titanium in the solid can also be recognized and determined by well known tests and procedures.

To make my new products the following examples are given:

*Example #1*

To 300 c. c. of a 1% solution of sulfuric acid add 5 grams of chromic acid. To this solution add freshly prepared and moist titanium compounds that have been prepared by hydrolysis from acid solutions. Add about the amount of the moist titanium compounds that would make about 30 grams of ignited material. After thoroughly mixing and heating to insure action, the solids are then freed from the liquid by filtering and washing with water. The solids will be found by analysis to be a titanium compound and to contain chromium in the form of a chromate. This is one form of my product.

*Example #2*

In this example I use a titanium sulfate solution that is prepared relatively free from iron Such a solution is described on page 2, paragraph beginning with line 24 of my patent #1,357,690 (1920). This solution is prepared by dissolving sodium titanium sulfate in 30% sulfuric acid. This solution is filtered to remove any foreign solids that may be present. To 200 c. c. of this solution at about 35° Beaumé add 10 grams of chromic acid and stir to complete solution. Pour this slowly into 1000 c. c. of boiling water and continue the boiling for a period of 10 to 60 minutes. A yellow solid is thrown out of the solution. Remove the solids from the liquids by filtering and washing. The solids will be found by analysis to be a titanium compound and to contain chromium in the form of a chromate. This is one form of my new product.

Example #3

In this example I will take the sulfate solution that is obtained by the action of sulfuric acid on a titanium ore, dissolving the reaction products, diluting and filtering. Such a solution is prepared to a concentration of about 35° Beaumé and is described in Patents #1,357,690 (1920) and #1,014,793 (1912). This solution contains iron and titanium in about equal quantities. The solution contains ferrous and ferric salts. As chromic acid oxidizes ferrous salts I prefer to accomplish this oxidation to the greater extent prior to the addition of chromic acid. To accomplish this the solution is placed in a diaphragm cell and a direct current is passed through until the greater amount of iron in the anode cell is in the ferric condition. The solution is removed and corrected to its original concentration. To 100 c. c. of this oxidized solution add 5 grams of chromic acid and 10 c. c. of hydrochloric acid. Mix to a uniform composition. Add this solution very slowly to 600 c. c. of boiling water and continue the heating for a period of 10 to 60 minutes. A yellow solid is thrown out of the solution. Remove the solids by filtering and washing. The solids will be found by analysis to be a titanium compound and contain chromium in the form of a chromate. This is one form of my new product.

The above examples are for illustrative purposes. No attempt is made to accomplish economies, or to give the optimum conditions. It will be seen by those familiar in the art that there are other conditions, materials and arrangements that will give results similar as to the element content in a product that is containing titanium and chromium, the chromium being in the form of a chromate.

I acknowledge the lack of scientific data from which an accurate chemical description can be made for this class of chemical products, from the physical and chemical properties as observed, I prefer to call these products basic titanium chromates or hydrated basic titanium chromates. This may or may not be their true composition.

The products will in themselves find valued uses as well as being a material from which other titanium materials can be made.

In view of the prior art I do not wish to be confined to the descriptions given or the relative amounts of material used.

What I claim is:

In a process of making a titanium compound containing chromium in the form of a chromate, the step of heating an aqueous titanium sulfate solution containing the chromate radical.

OSCAR T. COFFELT.